Dec. 14, 1926.

J. A. COLVIN

WINDSHIELD WIPER

Filed Nov. 9, 1925

1,610,361

Inventor
Jay A. Colvin
by Parks & Carter
Attorneys.

Patented Dec. 14, 1926.

1,610,361

UNITED STATES PATENT OFFICE.

JAY A. COLVIN, OF CHICAGO, ILLINOIS.

WINDSHIELD WIPER.

Application filed November 9, 1925. Serial No. 67,740.

My invention relates to improvements in windshield wipers and has for one object to provide a windshield wiper which will be stronger and more durable than those at present in use. Another object is to provide a wiper which when out of operation may be so manipulated as to relieve the pressure of the rubber squeegee against the glass of the windshield and thereby prevent permanent distortion of the squeegee. Another object is to provide a wiper wherein a stiff and heavy wiper arm may be used so that the wiper will have sufficient strength to clean the windshield even when the windshield is coated with snow, ice and the like. Other objects will appear from time to time throughout the specification and claims.

My invention is illustrated more or less diagrammatically in the accompanying drawings, wherein—

Like parts are indicated by like characters throughout.

Figure 1:
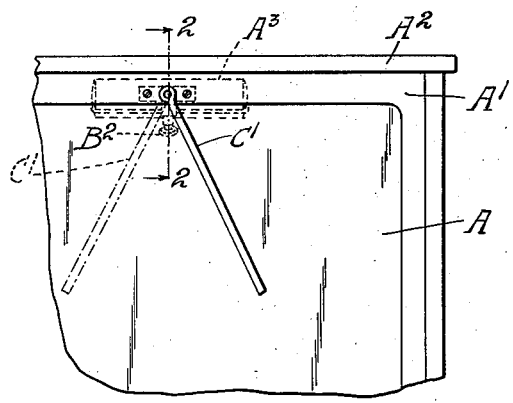
Figure 1 is a detail front elevation of an automobile windshield showing the wiper in place.
Figure 3:
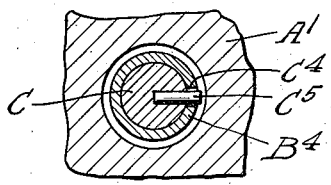
Figure 3 is a section along the line 3—3 of Figure 2 on a further enlarged scale.
Figure 2:
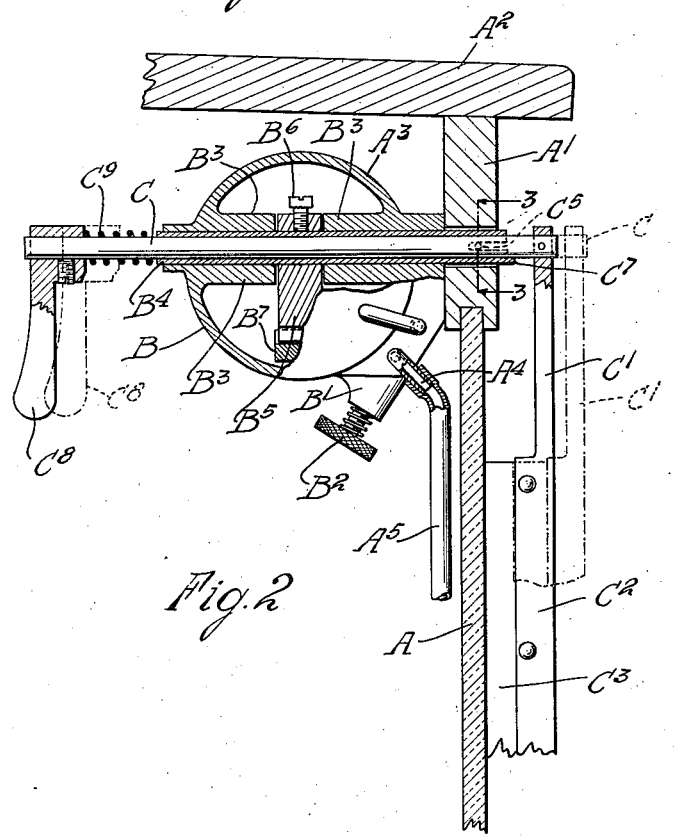
Figure 2 is a section along the line 2—2 of Figure 1 on an enlarged scale.
Figure 4:
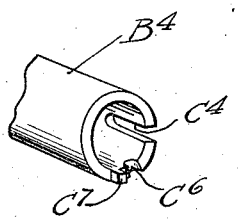
Figure 4 is a perspective of the end of the driving sleeve.

A is a glass windshield or vehicle window. In this case it is shown as a part of a closed body, $A^1$ being a rigid upper member in which the windshield is mounted. $A^2$ is the roof of the vehicle. $A^3$ is the vacuum motor which drives the cleaner. $A^4$ is a pipe leading from the motor housing and connected by means of a tubing $A^5$ with the vehicle motor not here shown whereby the power for operating the vacuum motor is provided.

B is the cylindrical body of the motor. Projecting therefrom is a valve housing $B^1$ with valve $B^2$ whereby the motor may be thrown into and out of operation. $B^3$ $B^3$ are hollow bearing bosses contained within the motor housing. $B^4$ is the driving sleeve mounted for rotation within the bosses or bearings $B^3$. $B^5$ is a lever mounted on the sleeve $B^4$ and held against rotation with respect thereto by the set screw $B^6$. $B'$ is a wrist pin pivoted in the lever $B^5$ adapted to connect with the driving piston not here shown. The sleeve $B^4$ extends clear across the housing and is open at both ends.

C is a rock shaft slidably mounted in the sleeve $B^4$. It carries at one end a rocker arm $C^1$ pinned thereto, which arm is enlarged at its lower end as at $C^2$ and carries the rubber or other suitable squeegee $C^3$ adapted to engage the face of the windshield. The sleeve $B^4$ is slotted at $C^4$ to engage a pin $C^5$ on the rod C. It is also notched at $C^6$ and provided with a stop lug $C^7$. $C^8$ is a manipulating lever pinned to the inner end of the rod C, there being a coil spring $C^9$ surrounding the rod and interposed between the lever $C^8$ and the end of the sleeve $B^4$. This spring tends to draw the shaft C inwardly and cause the squeegee $C^3$ to exert a pressure against the face of the windshield, the slot $C^4$ being deep enough to permit this while at the same time of sufficient depth not to limit the inward movement of the shaft.

When it is desired to throw the wiper out of operation the rod is pushed forward compressing the spring and then rotated with respect to the sleeve so as to bring the pin $C^5$ out of engagement with the slot $C^4$ and into engagement with the notch $C^6$ thus holding it against rotation and permitting the squeegee to remain out of contact with the surface of the windshield thereby permitting the squeegee to hang in a normal and unbent and uncompressed position.

The hand lever $C^8$ may also be manipulated if desired to rotate the squeegee independent of the motive power. Since the arm $C^1$ is a rigid and stiff one it does not tend to bend or yield and the coil spring may be made of any desired strength and stiffness so as to give any desired pressure of the squeegee upon the surface of the windshield.

The motor to operate the squeegee might be any suitable type, either the one shown or any other type of motor used for such work. The relatively long coil spring permits the squeegee to conform to the variations in the contour of the windshield or window surface in a much more satisfactory manner than is the case when a single flexible squeegee arm is used and the use of the coil spring makes it easier to adjust the tension of the squeegee on the windshield than is the case when a single spring arm is used.

It will be evident that while I have shown an operative device, still many changes might be made in the size, shape and disposition of parts without departing materially from the spirit of my invention and I wish therefore that my showing be taken as in a large sense as diagrammatic, and that the scope of the invention is to be determined from the claims.

I claim:

1. In a windshield wiper, a motor, a sleeve adapted to be oscillated thereby, a shaft slidable in the sleeve, a rock arm carried by the shaft, a squeegee carried by the arm, the end of the sleeve being slotted, a pin on the shaft adapted to engage the slot to hold shaft and sleeve against relative rotation.

2. In a windshield wiper, a motor, a sleeve adapted to be oscillated thereby, a shaft slidable in the sleeve, a rock arm carried by the shaft, a squeegee carried by the arm, the end of the sleeve being slotted, a pin on the shaft adapted to engage the slot to hold shaft and sleeve against relative rotation, means for exerting longitudinal pressure on the shaft to hold the squeegee against the windshield.

3. In a windshield wiper, a motor, a sleeve adapted to be oscillated thereby, a shaft slidable in the sleeve, a rock arm carried by the shaft, a squeegee carried by the arm, the end of the sleeve being slotted, a pin on the shaft adapted to engage the slot to hold shaft and sleeve against relative rotation, means for exerting longitudinal pressure on the shaft to hold the squeegee against the windshield, and a handle by which the shaft may be slid in an opposite direction to hold the squeegee out of engagement with the windshield.

4. In a windshield wiper, a motor, a sleeve adapted to be oscillated thereby, a shaft slidable in the sleeve, a rock arm carried by the shaft, a squeegee carried by the arm, the end of the sleeve being slotted, a pin on the shaft adapted to engage the slot to hold shaft and sleeve against relative rotation, means for exerting longitudinal pressure on the shaft to hold the squeegee against the windshield, and a handle by which the shaft may be slid in an opposite direction to hold the squeegee out of engagement with the windshield, the end of the shaft being notched at a point removed from the slot whereby the pin on the shaft may engage the notch to hold the squeegee in the inoperative position.

Signed at Chicago, county of Cook and State of Illinois, this 5th day of November, 1925.

JAY A. COLVIN.